(No Model.)
C. A. MILLER.
REGISTERING MEASURING FAUCET.
No. 475,945. Patented May 31, 1892.
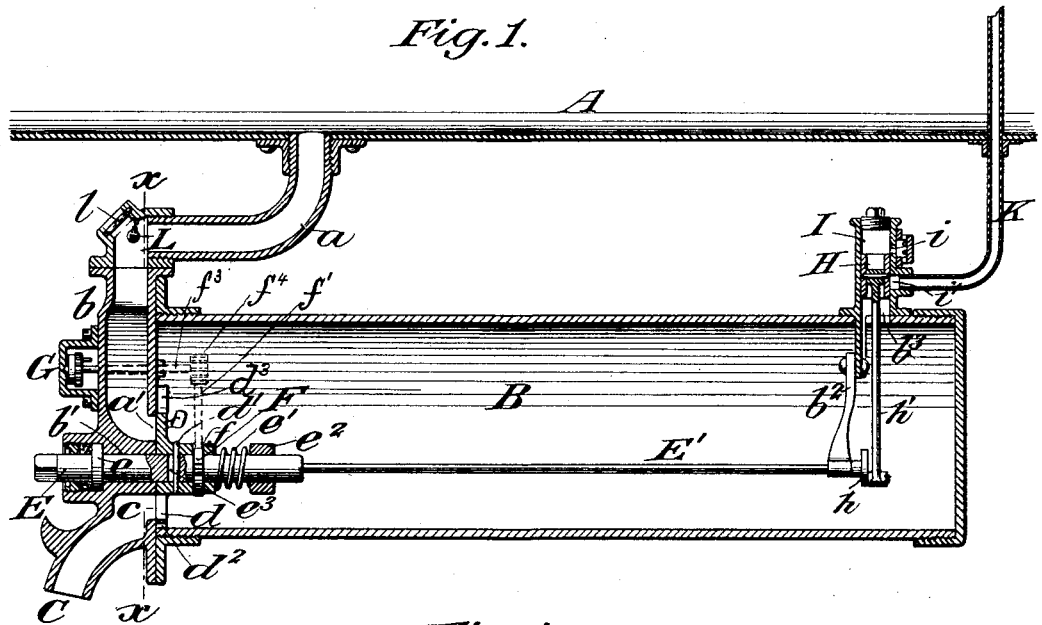
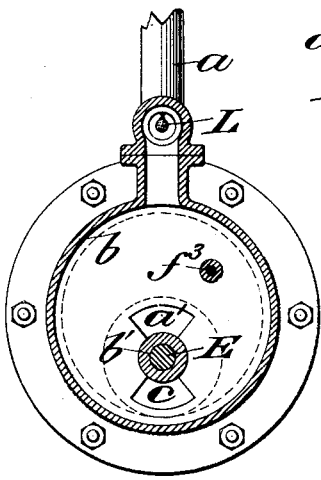
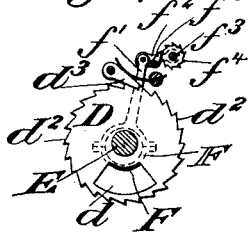
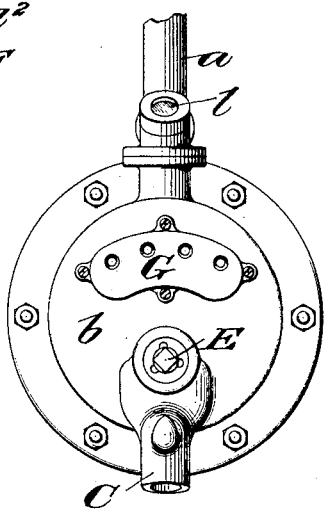
Witnesses:—
O. K. Nayrood
C. E. Sundgren
Inventor:—
Charles A. Miller
by attorneys
Brown & Seward

United States Patent Office.

CHARLES A. MILLER, OF BROOKLYN, NEW YORK.

REGISTERING MEASURING-FAUCET.

SPECIFICATION forming part of Letters Patent No. 475,945, dated May 31, 1892.

Application filed February 5, 1892. Serial No. 420,431. (No model.)

*To all whom it may concern:*

Be it known that I, CHARLES A. MILLER, of Brooklyn, in the county of Kings and State of New York, have invented a new and useful Improvement in Registering Liquid-Measures, of which the following is a specification.

My invention relates to an improvement in recording-measures, and more particularly in measures for use in connection with a general supply-tank, in which a predetermined quantity of liquid may be drawn at intervals from the supply-tank with perfect accuracy and a perfect register thereof automatically made.

A practical embodiment of my invention is represented in the accompanying drawings, in which—

Figure 1 is a view of the recording-measure in vertical longitudinal section, showing it connected with the bottom of the general supply-tank. Fig. 2 is a transverse section through line $x\ x$ of Fig. 1. Fig. 3 is an end view, and Fig. 4 is a view in detail of the mechanism for imparting the movement of the valve-spindle to the registering mechanism.

The general supply-tank is represented by A, the bottom only of said tank being shown in the present instance, and it being understood that the said tank may be capable of being mounted upon wheels, as for the purpose of dispensing oil, or otherwise arranged, as may be found desirable.

The body of the measure is represented by B and is supported in such relation to the supply-tank A that the liquid will flow from the tank A into the measure B when free communication is made between them.

The pipe through which the liquid flows from A to B is represented by $a$ and is shown in the present instance as communicating with the bottom of the tank A. The liquid as it flows from the tank A through the pipe $a$ is allowed to enter the measure B through an opening $a'$ at its front end. The liquid is allowed to escape from the measure B through an opening $c$ in the front end of the measure and located below the inlet-opening $a'$. After passing through the opening $c$ the liquid is conducted by means of a suitable spout C to the point where it is to be received into a receptacle.

A single valve D is employed to open and close the inlet and outlet openings $a'$ and $c$. I have shown the said valve as of circular-disk form provided with an opening $d$ through it, which as the valve is rotated is arranged to come alternately into position to register with the inlet-opening $a'$ and the outlet $c$. The valve D is fixed to rotate with the spindle E, seated in an extended bearing $b'$, formed in the casting $b$ at the front of the measure B. The spindle E extends from its bearing $b'$ through into the interior of the measure B, passing through the end of the measure at a point intermediate of the inlet and outlet openings $a'$ and $c$. The shoulder $e$, formed on the outer end of the stem E, serves to hold the stem against displacement toward the interior of the measure, and a spring $e'$, bearing at one end against a collar $e^2$ on the spindle and at its opposite end against the hub of the disk-valve D, serves to hold the valve seated snugly against the interior face of the end of the measure.

I find it convenient to secure the valve to the stem by means of a pin $d'$, extending through the hub of the valve and through an elongated slot $e^3$ in the stem E, so that the valve, while being carried around by the spindle, will at the same time be allowed a limited sliding movement relatively to the spindle in a direction to hold it firmly on its seat and take up wear. The front end of the spindle may be squared to receive an operating-crank.

To prevent the valve from rotating in more than one direction, I provide it with a series of ratchet-teeth $d^2$ and mount a pawl $d^3$ on the end of the measure in position to engage the said teeth. I further provide on the hub of the valve D a circular seat $f$, Fig. 1, eccentric with respect to the axis of the spindle E and mount thereon a strap F, having an arm $f'$ pivotally connected with the arm $f^2$, mounted on an arbor $f^3$, leading to one of a set of register-wheels G at the front of the measure. The arbor $f^3$ carries on its end within the measure a ratchet-wheel $f^4$, with which a pawl $f^5$, carried by the arm $f^2$, engages as the arm $f^2$ is rocked in one direction, so as to rotate the arbor $f^3$, and hence the registering wheel, connected therewith one step every time the spindle E is rotated. The register may be of any well-known or approved form and is indicated conventionally in the present drawings.

A rod E' forms a continuation of the spindle E within the measure B and is supported at or near its rear end by means of a hanger $b^2$, depending within the measure. The rear end of the prolongation E' is provided with a crank $h$, connected by a rod $h'$ with a hollow sliding valve H, seated within a tubular housing I, extending upwardly from the measure B and communicating with the interior of the measure through an opening $b^3$ in the wall of the measure. The tubular housing is provided with an opening $i$ to the outside air and with an opening $i'$, which opens into a pipe K, which extends upwardly through the bottom of the tank A and communicates with the air-space above the liquid within said tank. The movements of the sliding valve H are so timed with respect to the rotary valve D that air may be admitted through the opening $i$ when the opening $d$ in the valve D registers with the outlet-opening $c$, and when the said opening $d$ registers with the inlet opening $a'$ the said sliding valve H will close the opening $i$ and uncover the opening $i'$ in communication with the pipe K while the measure is being filled. For the purpose of determining when the measure B is full I provide a tell-tale bob L, suspended within the feed-pipe $a$, back of a transparent window $l$, through which the motion of the liquid within the feed-pipe $a$ may be observed by the operator at the front of the measure.

The operation is as follows: The measure B is filled by bringing the opening $d$ in the valve D to register with the opening $a'$ in communication with the feed-pipe $a$, leading from the tank A. While the filling is taking place the air from the tank B is allowed to escape up through the pipe K into the tank A and replace the liquid drawn from said tank. When the tank B is filled, the valve D may be rotated a half-revolution to bring the opening $d'$ therein to register with the outlet $c$, leading to the spout C. This movement will close the opening $a'$ and prevent the further entrance of liquid into the measure B and will at the same time operate the register and slide the valve H into position to close communication through the pipe K with the tank and open communication with the outside air through the opening $i$. This may be repeated as often as desired, and each filling and emptying of the measure will be registered.

It will be observed that by allowing the air to escape from the measure B into the tank A there is no liability of shutting off escape until the measure has become completely filled, and when so filled there is no liability of an overflow of oil through the vent, as the vent leads to the supply-tank. The operation of the register is beyond the control of the operator, and knowing the capacity of the tank A and the capacity of the measure B it may be readily ascertained whether or not exact measure has been given when the contents of the tank A have been drawn off by a comparison of its capacity or the amount stored therein, with the number of measures registered.

It is obvious that slight changes might be resorted to in the form and arrangement of the several parts described without departing from the spirit and scope of my invention. Hence I do not wish to limit myself strictly to the structure herein set forth; but

What I claim is—

1. A measure provided with inlet and discharge openings, a rotary valve for alternately closing the one and opening another of said openings, a register controlled by said opening and closing valve, and means for letting the air out of the measure and into the measure as it is filled and emptied, substantially as set forth.

2. The combination, with the supply-tank and measure, of a conduit leading from the supply-tank to the measure, a separate outlet-conduit leading from the measure, a single valve for alternately opening the one conduit and closing the other, a vent-conduit leading from the measure to a point above the liquid in the supply-tank, a vent-conduit leading to the open air, and means within the measure under the control of the aforesaid valve for opening and closing said vent-conduit as the inlet and outlet conduits are opened and closed, substantially as set forth.

3. The combination, with the measure, with its inlet and outlet openings, and the rotary valve for alternately opening and closing the said openings, of two vent-conduits, and a valve for alternately opening and closing said conduits, said valve being under the control of the aforesaid rotary valve, and the connection between the rotary valve and the vent-operating valve being located within the measure, substantially as set forth.

4. The combination, with the measure and its inlet and outlet openings, of the valve-spindle and the valve having a longitudinal movement along the spindle toward its seat, a spring for holding the valve to its seat, a register, and a connection between the valve and register, the said connection having an eccentric engagement with the valve, substantially as set forth.

CHAS. A. MILLER.

Witnesses:
FREDK. HAYNES,
GEORGE BARRY.